US010711626B2

(12) United States Patent
Humhauser et al.

(10) Patent No.: US 10,711,626 B2
(45) Date of Patent: Jul. 14, 2020

(54) GUIDE VANE RING AND TURBOMACHINE

(71) Applicant: MTU Aero Engines AG, Munich (DE)

(72) Inventors: Werner Humhauser, Moosburg (DE); Hermann Klingels, Dachau (DE)

(73) Assignee: MTU Aero Engines AG, Munich (DE)

( * ) Notice: Subject to any disclaimer, the term of this patent is extended or adjusted under 35 U.S.C. 154(b) by 956 days.

(21) Appl. No.: 14/942,342

(22) Filed: Nov. 16, 2015

(65) Prior Publication Data
US 2016/0146027 A1 May 26, 2016

(30) Foreign Application Priority Data
Nov. 25, 2014 (DE) .................... 10 2014 223 975

(51) Int. Cl.
*F01D 9/04* (2006.01)
*F01D 17/16* (2006.01)
*F01D 11/00* (2006.01)
*F01D 17/14* (2006.01)

(52) U.S. Cl.
CPC ............ *F01D 9/041* (2013.01); *F01D 9/042* (2013.01); *F01D 11/001* (2013.01); *F01D 17/14* (2013.01); *F01D 17/162* (2013.01); *F05D 2220/32* (2013.01); *F05D 2240/12* (2013.01); *F05D 2260/30* (2013.01); *Y02T 50/671* (2013.01)

(58) Field of Classification Search
CPC . F01D 9/04; F01D 9/041; F01D 9/042; F01D 25/246; F01D 17/12; F01D 17/14; F01D 17/16; F01D 17/162; F01D 11/001; F01D 5/025; F01D 5/30; F01D 5/3023; F01D 29/056; F04D 29/322; F04D 29/323; F05D 2240/12; F05D 2240/50; F05D 2220/32; F05D 2260/30; F05B 2240/50; Y02T 50/671
USPC ......................................................... 415/229
See application file for complete search history.

(56) References Cited

U.S. PATENT DOCUMENTS

| 2,651,492 A | * | 9/1953 | Feilden | F01D 9/042 |
| | | | | 415/137 |
| 2,980,475 A | * | 4/1961 | Wolfe | C10M 7/00 |
| | | | | 384/278 |
| 3,075,744 A | * | 1/1963 | Peterson | F01D 5/182 |
| | | | | 415/115 |
| 3,269,701 A | * | 8/1966 | Miller | F01D 9/042 |
| | | | | 415/209.4 |
| 3,314,654 A | * | 4/1967 | Thenault | F01D 17/162 |
| | | | | 415/160 |
| 3,764,189 A | * | 10/1973 | Prostler | F01D 5/288 |
| | | | | 384/278 |

(Continued)

FOREIGN PATENT DOCUMENTS

DE 10225679 A1 12/2003
DE 102006024085 A1 11/2007
(Continued)

*Primary Examiner* — David E Sosnowski
*Assistant Examiner* — Wayne A Lambert
(74) *Attorney, Agent, or Firm* — Barlow, Josephs & Holmes, Ltd.

(57) ABSTRACT

The invention is directed to a guide vane ring for a turbomachine, in which a vane bearing is produced in the inner ring via platform plates of the vanes and reliability against disintegration is produced via journals that extend radially inward from the platform plates, as well as a turbomachine.

7 Claims, 3 Drawing Sheets

(56) References Cited

U.S. PATENT DOCUMENTS

| | | | | |
|---|---|---|---|---|
| 3,990,810 | A * | 11/1976 | Amos | F01D 17/162 415/161 |
| 4,025,227 | A * | 5/1977 | Greenberg | F01D 17/162 415/160 |
| 4,193,738 | A * | 3/1980 | Landis, Jr. | F01D 11/005 277/387 |
| 4,514,141 | A * | 4/1985 | Marey | F01D 17/162 415/160 |
| 4,604,030 | A * | 8/1986 | Naudet | F01D 11/001 415/126 |
| 4,834,613 | A * | 5/1989 | Hansen | F01D 17/162 415/160 |
| 4,990,056 | A * | 2/1991 | McClain | F01D 11/001 29/889.22 |
| 5,039,277 | A * | 8/1991 | Naudet | F01D 17/162 415/150 |
| 5,129,783 | A * | 7/1992 | Hayton | F01D 5/284 415/209.2 |
| 5,380,152 | A * | 1/1995 | Sikorski | B29D 99/0025 415/160 |
| 5,421,703 | A * | 6/1995 | Payling | F01D 9/042 415/209.3 |
| 5,636,968 | A * | 6/1997 | Audet | F01D 17/162 415/160 |
| 5,639,212 | A * | 6/1997 | Schaefer | F01D 11/001 415/173.1 |
| 6,086,327 | A * | 7/2000 | Mack | F01D 17/162 384/273 |
| 6,129,512 | A * | 10/2000 | Agram | F01D 17/162 415/160 |
| 6,179,559 | B1 * | 1/2001 | Weaver | F01D 5/148 415/150 |
| 6,180,574 | B1 * | 1/2001 | Ryan | C10M 107/28 508/106 |
| 6,283,705 | B1 * | 9/2001 | Rice | F01D 17/162 415/160 |
| 6,413,043 | B1 * | 7/2002 | Bouyer | F01D 9/042 29/451 |
| 6,799,945 | B2 * | 10/2004 | Chatel | F01D 17/162 415/156 |
| 6,984,105 | B2 | 1/2006 | Clark et al. | |
| 7,112,039 | B2 * | 9/2006 | Brooks | F01D 17/162 415/156 |
| 7,125,222 | B2 * | 10/2006 | Cormier | F01D 17/162 415/160 |
| 7,510,369 | B2 * | 3/2009 | Lytle | F01D 17/162 29/889.22 |
| 7,588,415 | B2 * | 9/2009 | Giaimo | F01D 11/001 415/160 |
| 7,628,579 | B2 * | 12/2009 | Giaimo | F01D 17/162 415/160 |
| 7,665,959 | B2 * | 2/2010 | Giaimo | F01D 17/162 415/160 |
| 7,690,889 | B2 * | 4/2010 | Giaimo | F01D 17/162 415/160 |
| 7,713,022 | B2 | 5/2010 | Major et al. | |
| 7,802,963 | B2 * | 9/2010 | Holland | F01D 9/042 415/148 |
| 7,806,652 | B2 | 10/2010 | Major et al. | |
| 7,854,586 | B2 | 12/2010 | Major et al. | |
| 8,202,043 | B2 * | 6/2012 | McCaffrey | F01D 17/162 415/160 |
| 8,376,692 | B2 * | 2/2013 | Stiehler | F01D 9/042 415/160 |
| 8,668,445 | B2 * | 3/2014 | Crespo | F01D 9/04 415/160 |
| 9,995,166 | B2 * | 6/2018 | Vandeputte | F01D 9/045 |
| 2002/0061249 | A1 * | 5/2002 | Caubet | F01D 5/143 415/160 |
| 2003/0113204 | A1 * | 6/2003 | Wolf | F01D 17/162 415/165 |
| 2004/0240991 | A1 * | 12/2004 | Bruce | F01D 17/162 415/160 |
| 2005/0031238 | A1 | 2/2005 | Bruce et al. | |
| 2005/0084190 | A1 * | 4/2005 | Brooks | F01D 17/162 384/276 |
| 2006/0078420 | A1 * | 4/2006 | Barbe | F01D 17/162 415/159 |
| 2007/0160463 | A1 * | 7/2007 | Jahns | F01D 17/162 415/160 |
| 2009/0208338 | A1 | 8/2009 | Major et al. | |
| 2009/0317241 | A1 * | 12/2009 | Major | F01D 17/162 415/148 |
| 2010/0202873 | A1 * | 8/2010 | Andrew | F01D 5/187 415/116 |
| 2014/0234087 | A1 | 8/2014 | Marshall | |
| 2017/0191367 | A1 * | 7/2017 | Sak | F01D 9/041 |

FOREIGN PATENT DOCUMENTS

| | | |
|---|---|---|
| DE | 102009038623 A1 | 3/2011 |
| EP | 1524412 A2 | 4/2005 |
| EP | 1586744 A2 | 10/2005 |
| EP | 1746258 A2 | 1/2007 |
| EP | 1757776 A2 | 2/2007 |
| EP | 1760272 A2 | 3/2007 |

* cited by examiner

GUIDE VANE RING AND TURBOMACHINE

BACKGROUND OF THE INVENTION

The invention relates to a guide vane ring and a turbomachine in accordance with the present invention.

For establishing optimal operating conditions, turbomachines such as aircraft engines usually have, on the compressor side, at least one adjustable row of guide vanes having a plurality of guide vanes that can be pivoted around their vertical axis. The row of guide vanes forms a guide vane ring with an inner ring embracing a rotor segment. The inner ring serves for the inner stabilizing of the guide vanes. In known guide vane rings, a radial bearing of the guide vanes is produced via radial outer-lying adjusting journals of the guide vanes, these journals interacting with a corresponding adjusting mechanism on the stator side. This type of bearing is also named spoke-centered bearing. The radial inner stabilizing is usually produced via bearing journals that extend radially inward from a vane platform and are guided into bearing bushes of the inner ring. The bearing journals simultaneously represent a protection against disintegration in the case of strong axial movements of the inner ring relative to the guide vanes, for example, as a consequence of so-called pumping processes or a bird impact. Large forces are transferred to the guide vanes in the case of such axial movements, due to a very tight fit between bearing journal and bearing bush.

Guide vane rings that show such bearing journals are shown, for example, in U.S. Pat. No. 7,806,652 B2, U.S. Pat. No. 6,984,105 B2, US 2005/0031238 A1, US 2009/0208338 A1 and in U.S. Pat. No. 7,713,022 B2.

Guide vane rings without bearing journals are likewise known. These guide vane rings make possible a very flat construction of the inner ring, but tend to disintegrate in the case of a very large relative axial movement of the inner ring.

SUMMARY OF THE INVENTION

The object of the invention is to create a guide vane ring for a turbomachine that eliminates the above-named disadvantages, and offers an effective protection for the row of guide vanes against disintegrating upon a large relative axial movement of an inner ring, in the case of a compact construction of the inner ring. It is also an object of the invention to create a turbomachine that offers a high reliability against such disintegration.

This object is achieved by a guide vane ring and a turbomachine of the present invention.

A guide vane ring according to the invention for a turbomachine has a plurality of rotatable guide vanes that are mounted radially outward in the radial direction, and an inner ring for the radial inner stabilizing of the guide vanes. According to the invention, each of the guide vanes has an inner platform plate, and by means of the cylindrical surface of the plate, the guide vanes are guided by sliding in an uptake of the inner ring. A journal extends from the platform plates, in each case radially inward, this journal having a minimum length that is greater than a minimum depth of the uptake, and being arranged between the inner ring and the guide vanes without relative axial offset and without contact in a journal borehole, which passes through a bottom segment of the respective uptake.

According to the invention, the task of the platform plate and that of the journal are functionally separated. With their large cylindrical surface, the platform plates undertake the task of bearing the guide vane in the inner ring and also providing an associated good sealing of the plate against leakage therewith.

The journals do not take part in the bearing function and, in the case of large axial excursions of the inner ring, e.g., in the case of pumping or a bird impact, the journals are thus optimized for the task of ensuring a form-fitting connection between the guide vanes and the inner ring; smaller forces are transferred onto the guide vanes as for a conventional bearing. In failure cases, if a platform plate becomes disengaged from its uptake on the side of the inner ring, a form-fitting connection of the vane to the inner ring is assured by means of the journal. A compact construction of the inner ring is also made possible by the functional separation.

Preferably, the platform plates are guided without bushes into the uptakes. By means of this measure, bearing bushes are dispensed with, so that the number of parts and thereby the weight of the guide vane ring are also reduced and its mounting is simplified or accelerated.

In order to achieve a long service life and a low-friction guiding of the guide vanes on the side of the inner ring, it is advantageous if at least the cylindrical surfaces are provided with a corresponding coating, at least for bearing without bushes.

Each of the journals can have a radial collar, whose outer diameter is greater than an inner diameter of the journal boreholes. By means of this measure, it is prevented that the guide vanes and the inner ring become separated from one another in the case of an unexpected, large relative axial movement. In particular, the respective radial collar is a free end segment of the journal.

The weight of the inner ring can be reduced if an inner ring region is formed as a type of hollow space or cavity radially inward relative to the uptakes.

For purposes of mounting, the inner ring can have two axially separated ring segments that together form the inner ring. For further simplification of the mounting, the ring segments can be divided into two halves, or an upper and a lower ring segment half. The ring segments have a plurality of cavities, wherein uptakes for cooperating with connection means are introduced into at least several separating walls, which separate the cavities from one another in the peripheral direction. A deformation of the ring segments upon joining is prevented thereby, since no cavities are found in the region of the connection means; rather, the inner ring has only solid cross sections.

In order to prevent gas from entering into the cavities, it is advantageous if these cavities are closed radially inward. For this purpose, one of the ring segments can have an axial projection that forms a contact region with the other ring segment.

A turbomachine according to the invention has at least one guide vane ring according to the invention. It is thereby characterized by reduced leakage sites in the region of the guide vane ring, a lower weight, and high reliability against disintegration of the platform plates and the inner ring based on relative axial movements between the guide vane ring and the inner ring, in comparison to turbomachines having known guide vane rings.

Various advantageous embodiment examples are discussed in detail herein.

BRIEF DESCRIPTION OF THE DRAWING FIGURES

A preferred example of embodiment of the invention will be explained in more detail in the following on the basis of very simplified schematic representations. Herein:

DETAILED DESCRIPTION OF THE INVENTION

Figure 1:
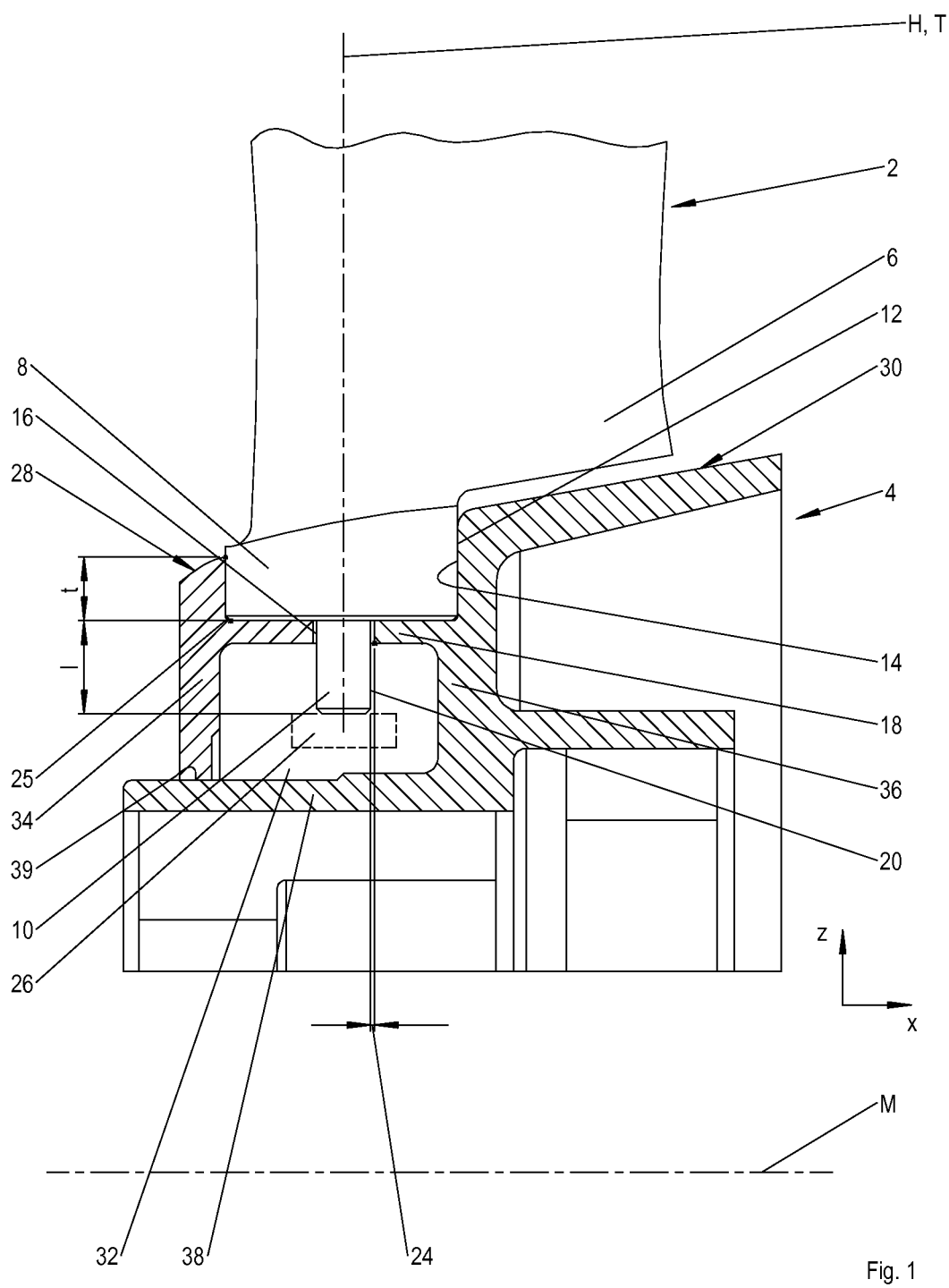
FIG. 1 shows an axial section through a radially inner region of a guide vane ring according to the invention without a relative axial displacement of its inner ring.

FIG. 1 shows an axial section through a radially inner region referred to its central axis M of a guide vane ring 1 according to the invention for a turbomachine, such as an aircraft engine and the like. The central axis M is equal to the longitudinal axis of the machine or the rotational axis of the rotor of the turbomachine. In the mounted state, the guide vane ring 1 embraces a section (not shown) of a rotor of the turbomachine that is on the side of the compressor and is particularly a section on the inlet side.

The guide vane ring 1 essentially has a plurality of guide vanes 2 and an inner ring 4. The guide vanes 2 can be adjusted about their vane axis or vertical axis H extending in the radial direction z and each has a vane element 6 and an inner vane plate or platform plate 8 with a circular cross section. A journal 10, which will be explained further below, extends from the platform plate 8, radially inward in each case, opposite to the vane element 6.

Each of the guide vanes 2 also has a radially outward vane plate (not shown) referred to the central axis M, as well as an adjusting journal extending radially outward from the outer vane plate, and each of the guide vanes interacts with an adjusting mechanism via this journal in order to pivot about its vertical axis H. The guide vanes 2 are borne via their adjusting journals radially outward in the radial direction and are thus spoke-centered. The inner ring 4 serves for the inner stabilizing of the guide vanes 2.

The guide vanes 2 are stabilized radially inward in uptakes 14 of the inner ring 4 via their platform plates 8 and particularly via their cylindrical surfaces 12. In order to reduce friction and increase the service life, the cylindrical surfaces 12 and/or the uptakes 14 are provided with a corresponding coating on the side of the inner periphery.

The journals 10 serve for securing the form-fitting connection of guide vanes 2/inner ring 4 or for preventing disintegration in the case of a large axial movement of the inner ring 4 relative to the guide vanes 2. The journals 10 have a cylindrical configuration and each journal passes through a journal borehole 16, which is introduced into a central bottom segment 18 of the uptakes 14. The journals 10 are taken up laterally without contact in the journal boreholes 16. For this purpose, their outer diameter is set to be smaller than an inner diameter of the journal boreholes 16, so that for the guide vanes 2, if the guide vanes 2 are stabilized in the inner ring 4 via their platform plates 8, an annular gap 24 is formed between outer peripheral surfaces 20 of the journals 10 and unnumbered inner peripheral surfaces of the journal boreholes 16. The journals 10 also have a minimum length I, which is greater than a minimum depth t of uptakes 14.

Figure 2:
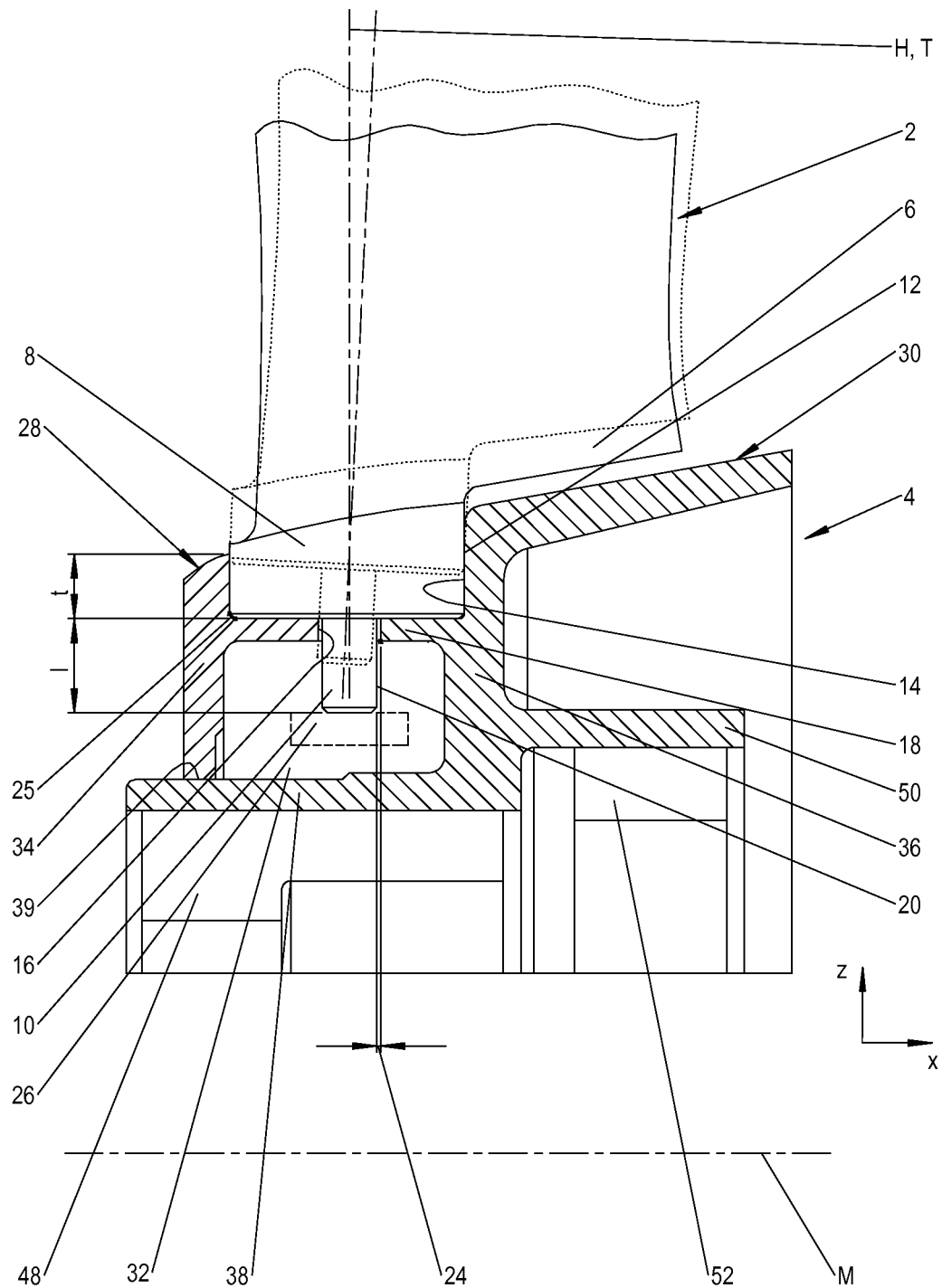
FIG. 2 shows an axial section through the radially inner region of the guide vane ring according to the invention with a relative axial displacement of its inner ring.

The mode of operation of the invention in the case of a relative axial movement of the inner ring 4 relative to the guide vanes 2 for preventing disintegration is illustrated in FIG. 2: In the case of a large relative axial displacement of the inner ring 4 relative to the guide vanes 2, for example, as a consequence of a pumping process, the respective guide vane 2 with its platform plate 8 can be elevated from the uptake 14 and thus the form fit between the platform plate 8 and the inner ring 4 can be abolished. By means of the respective journal 10, however, a complete elimination of the form fit between the guide vane 2 and the inner ring will be prevented, since, due to its greater minimum length I in comparison to the minimum depth t of the uptake 14, the journal is now found in form-fitting engagement with its journal borehole 16. After the pumping process has terminated, the platform plate 8 of the respective guide vane 2 and thus the respective guide vane 2 will be introduced again into the uptake via the form fitting of the journal 10 with the journal borehole 16, and the radial inner stabilizing of the guide vanes 2 is again provided exclusively via the platform plates 8. For simplified introduction, at least the platform plates 8 can be provided with an encircling oblique surface 25 at their radially inner annular edge.

In order to also prevent disintegration in the case of an unexpected, large relative axial movement of the inner ring 4 relative to the guide vanes 2, each of the journals 10 can have a radial collar 26 indicated by the dashes. This collar is preferably formed on the free end segment of the journal 10 and has an outer diameter that is greater than the inner diameter of the journal boreholes 16. In the case of an unexpected, large relative axial movement, the respective radial collar 26 runs on the bottom segment 18 and thus prevents another axial displacement of the inner ring 4 relative to the respective guide vane 2.

The inner ring 4 is composed of two ring segments 28, 30, which are combined along an axial separating plane T. The ring segments 28, 30 are in turn divided here into two ring-segment halves. In the direction of flow x of a primary flow flowing through the turbomachine, the inner ring 4 has a front ring segment 28 and a back ring segment 30, each of which has an upper ring-segment half and a lower ring-segment half. Of course, other divisions of the ring segments 28, 30, such as three divisions, four divisions, and the like, are also possible.

The front and the back ring segments 28, 30 each form one-half of the uptakes 14 and one-half of the journal boreholes 16. Thus the vertical axes H of the guide vanes 2 lie in the separating plane T. The segments are joined together via connection means (not shown), such as bolts. In the state where they are joined together or connected, they have a plurality of cavities 32. The inner ring 4 is configured like a hollow space or a hollow profile.

The cavities 32 are bounded axially by opposite-lying radial wall structures 34, 36 of the ring segments 28, 30. Radially outward, the cavities 32 are bounded by the bottom segment 18 of the uptakes 14 and by peripheral sections (not shown) of the ring segments 28, 30 extending between the bottom segments 18. Radially toward, the cavities 32 are bounded by a front axial projection 38 of the back ring segment 30. The front axial projection 38 extends from the radial wall structure 36 of the back ring segment 30 in the direction of the radial wall structure 34 of the front ring segment 28 and beyond this structure, whereby an annular contact region 39 is formed between the front axial projection 38 and the front radial wall structure 34. In the peripheral direction, as shown in FIG. 3, the cavities 32 are bounded and separated from one another via separating walls 40, 42.

Figure 3:
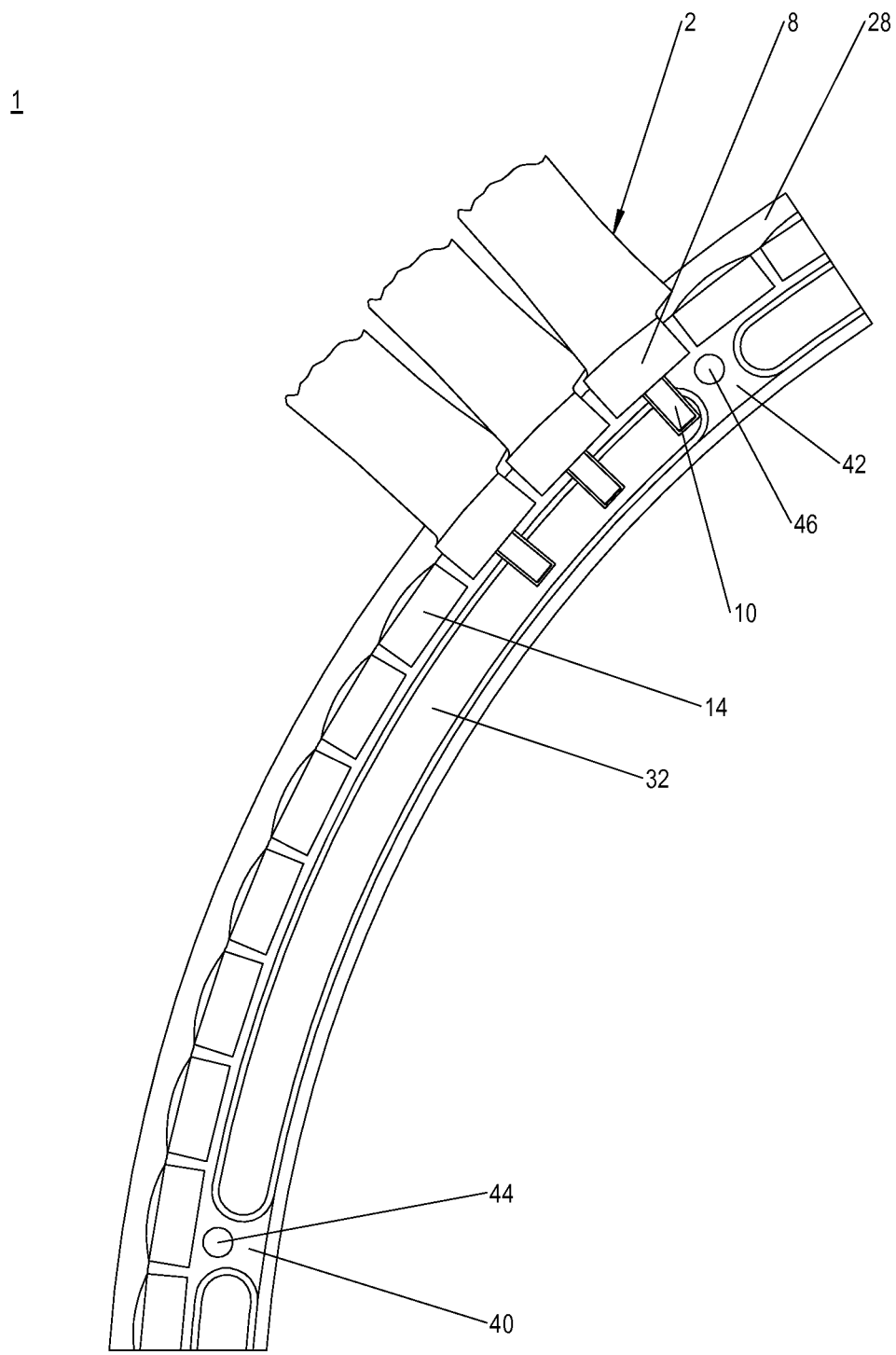
FIG. 3 shows a section through a region of a ring segment of the guide vane ring along line AA of FIG. 1.

As also shown in FIG. 3, the cavities 32 extend over several uptakes 14. In this case, bushings 44, 46 for taking up the connection elements can be introduced into the separating walls 40, 42, so that the ring segments 28, 30 have solid cross sections in the region of their connection sites. In this way, deformations of the inner ring 4 are prevented during mounting.

As shown further in FIG. 2, sealing elements 48 on the side of the inner periphery for interacting with opposite-lying sealing webs (not shown) on the rotor side are disposed on the front axial projection 38 of the back ring segment 36. The back ring segment 36 also has a back axial projection 50, which extends radially inward to the front axial projection 38 and, opposite to this, from the back ring segment 36, and is also provided on the side of the inner periphery with sealing elements 52 for interacting with opposite-lying sealing webs (not shown) on the rotor side.

Disclosed is a guide vane ring for a turbomachine, in which a vane bearing is produced in the inner ring via platform plates of the vanes reliability and security against disintegration is produced via journals that extend radially inward from the platform plates, as well as a turbomachine.

What is claimed is:

1. A guide vane ring for a turbomachine comprising,
    a plurality of rotatable guide vanes that are borne radially outward in a radial direction, and
    an inner ring configured and arranged to stabilize the guide vanes,
    wherein each of the plurality of rotatable guide vanes has an inner platform plate, and by a cylindrical surface of the inner platform plate, each of the plurality of guide vanes are guided by sliding in an uptake of the inner ring,
    wherein a journal extends radially inward from the inner platform plate in each case, the journal having a minimum length that is greater than a minimum depth of the uptake, and being disposed without contact in a journal borehole without relative axial offset, between the inner ring and each of the plurality of guide vanes, the journal borehole passing through a bottom segment of a respective uptake,
    wherein the minimum length of the journal and the minimum depth of the respective uptake each extend in the radial direction,
    wherein the inner ring has two axially separated ring segments, one of the axially separated ring segments has a radially inward axial projection, which forms a contact region with the other of the axially separated ring segment, and at least one seal in contact with the radially inward axial projection, and
    wherein the inner ring further has a plurality of cavities, radially inward relative to the uptakes, at least one of the plurality of cavities receiving a plurality of the journals, and a plurality of separating walls which separate the plurality of cavities from one another in a peripheral direction.

2. The guide vane ring according to claim 1, wherein the inner platform plates are guided without bushes into the uptakes.

3. The guide vane ring according to claim 2, wherein the cylindrical surfaces are coated.

4. The guide vane ring according to claim 1, wherein each of the journals has a radial collar, whose outer diameter is greater than an inner diameter of the journal boreholes.

5. The guide vane ring according to claim 1, wherein the inner ring further includes respective uptakes for interacting with a respective connectors introduced into at least several of the plurality of separating walls.

6. The guide vane ring according to claim 5, wherein one of the axially separated ring segments has a second radially inward axial projection.

7. The guide vane ring according to claim 1, wherein the guide vane ring is configured and arranged for use in a turbomachine.

* * * * *